(No Model.)
T. JOLLIFF.
FENCE.
No. 550,178.
Patented Nov. 19, 1895.
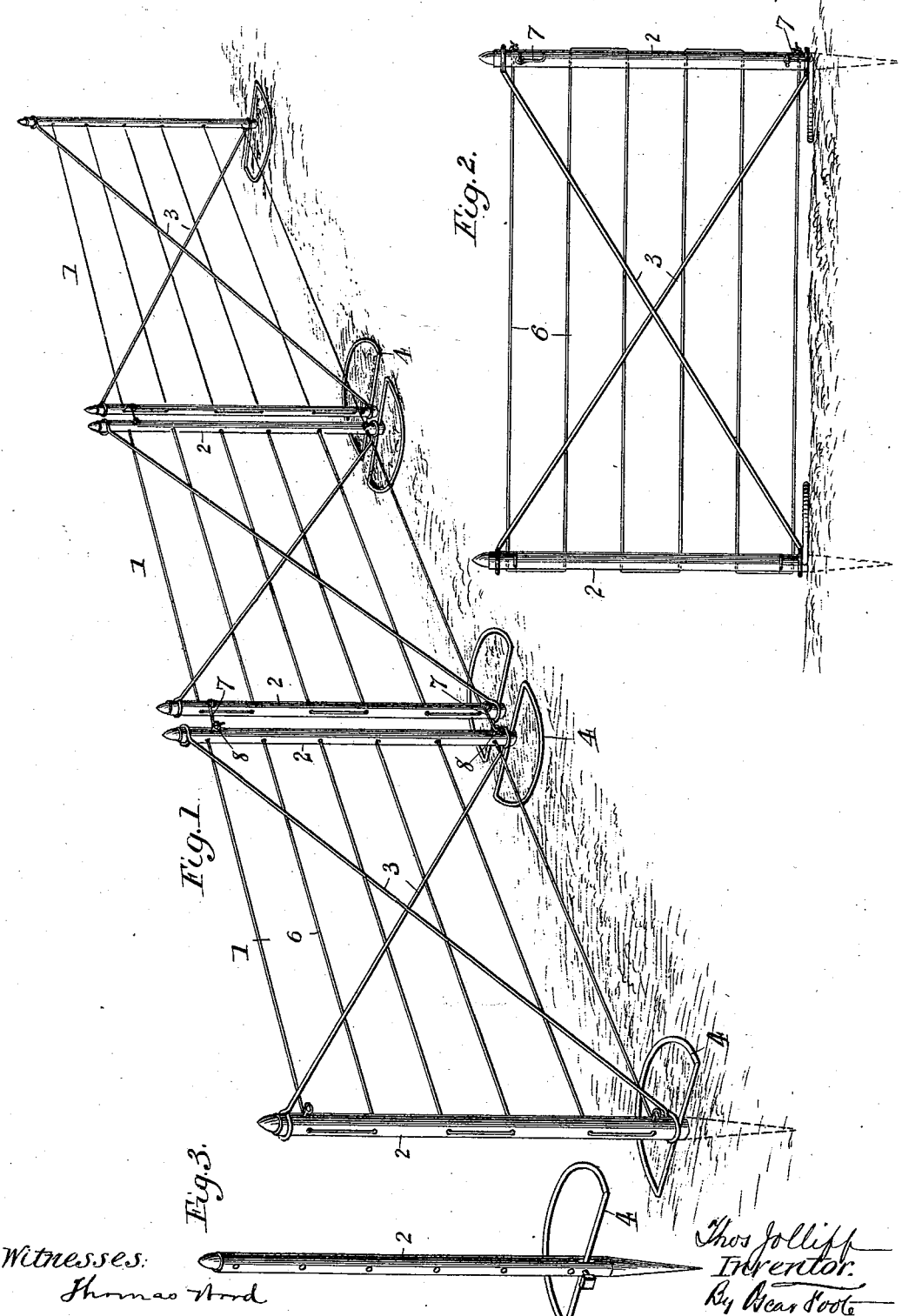

UNITED STATES PATENT OFFICE.

THOMAS JOLLIFF, OF NEWBERRY, INDIANA.

FENCE.

SPECIFICATION forming part of Letters Patent No. 550,178, dated November 19, 1895.

Application filed May 1, 1894. Renewed October 25, 1895. Serial No. 566,935. (No model.)

*To all whom it may concern:*

Be it known that I, THOMAS JOLLIFF, a citizen of the United States, residing at Newberry, in the county of Green and State of Indiana, have invented certain new and useful Improvements in Fence Construction; and I do hereby declare the following to be a full, clear, and exact description of the invention, such as will enable others skilled in the art to which it appertains to make and use the same.

This invention relates to an improvement in fences.

One object of the invention is to provide a fence having the base portion of the posts so constructed as to be braced against loosening from lateral pressure brought to bear thereon, as by the rubbing of animals against the same.

A further object is to provide a fence constructed of sections each independent of the other and capable of being removed from point to point without interfering with its construction.

The invention consists in the novel construction and combination of parts of the fence, as will be hereinafter described and claimed.

In the accompanying drawings, forming a part of this specification, and in which like numerals of reference indicate corresponding parts, Figure 1 is a perspective view of the fence constructed in accordance with my invention. Fig. 2 is a similar view of one of the sections detached. Fig. 3 is a view of a post, showing a modified form of base.

The fence is constructed of a series of independent sections 1, each of which consists of two posts 2, which are rigidly connected by means of cross-tie rods 3, connected, respectively, at the top and bottom portions of each post. Secured at the bottom of each post is a semicircular base 4, the straight sides of which are toward the outer sides of the post and the curved portions on the inner sides. The object of this arrangement is to permit of the sections being secured close together with their posts practically abutting, which could not be accomplished if the order were reversed.

In Fig. 1 the straight sides of the base are shown as passed through holes or openings in the posts, and under ordinary circumstances this will be found as best suited to ordinary uses where the ground is level; but in order to adapt the post to uneven or hilly ground, the base may be made adjustable, as shown in Fig. 3, thus to permit of its being firmly seated irrespective of the nature of the ground. The posts are pointed at their lower ends and project a sufficient distance downward from the bases to permit the pointed portions being driven in the ground to render the posts perfectly rigid. The posts of each section are connected by a series of wires 6, which are preferably held in place by being interwoven through openings extending through the posts; but it is to be understood that, if desired, the wires may be secured in place by being twisted around the posts in the ordinary manner. Each post at one end of a section carries a series of hooks 7, and the post at the opposite end a series of eyes 8, the hooks in one section being adapted to engage the eyes in the adjacent section in an obvious manner.

In constructing the fence, the sections are first secured in place by driving the pointed end of the posts into the ground until the base portions bear firmly thereon. The hooks on one section are then brought into engagement with the eyes on the adjacent section, thus connecting the entire sections firmly together.

The sections are constructed of such length as to permit of their being readily handled, in order that should it be desired to remove the fence from place to place the sections may be lifted from the ground and placed upon a wagon or other conveyance. The posts and cross-tie rods are preferably constructed of metal and the bases 4 of like material bent to the form shown.

Having thus fully described my invention, what I claim as new, and desire to secure by Letters Patent, is—

1. A fence, comprising a series of independent sections, each section comprising two posts having lower pointed ends, cross-tie rods and parallel strands connecting said posts, a semi-circular base secured near the bottom of each of said posts and having its straight side toward the outer face of said post, and means for securing said sections of the fence together, substantially as set forth.

2. A fence, comprising a series of independent sections, each section comprising two posts having lower pointed ends, cross-tie rods and parallel strands connecting said posts, a semi-circular base secured near the bottom of each of said posts, said base being capable of adjustment to different angles, and means for securing the sections of the fence together, substantially as set forth.

3. A fence, comprising a series of independent sections, each section comprising two posts having holes or openings near their lower pointed ends, cross-tie rods and parallel strands connecting said posts, a skeleton base of semi-circular form secured in the hole or opening of each post, said base being capable of adjustment to different angles, and means for securing said sections of the fence together, substantially as set forth.

In testimony whereof I affix my signature in presence of two witnesses.

THOMAS JOLLIFF.

Witnesses:
R. C. HILBURN,
W. A. HILBURN.